US009817223B2

(12) United States Patent
Hein

(10) Patent No.: US 9,817,223 B2
(45) Date of Patent: Nov. 14, 2017

(54) DIGITAL MICROSCOPE COMPRISING PIVOTING STAND, METHOD FOR CALIBRATION AND METHOD FOR AUTOMATIC FOCUS AND IMAGE CENTER TRACKING FOR SUCH A DIGITAL MICROSCOPE

(71) Applicant: Carl Zeiss Microscopy GmbH, Jena (DE)

(72) Inventor: Detlef Hein, Göttingen (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 15/021,809

(22) PCT Filed: Oct. 28, 2014

(86) PCT No.: PCT/EP2014/073039
§ 371 (c)(1),
(2) Date: Mar. 14, 2016

(87) PCT Pub. No.: WO2015/063047
PCT Pub. Date: May 7, 2015

(65) Prior Publication Data
US 2016/0231552 A1 Aug. 11, 2016

(30) Foreign Application Priority Data

Nov. 4, 2013 (DE) .................. 10 2013 222 295

(51) Int. Cl.
*G02B 21/00* (2006.01)
*G02B 21/24* (2006.01)
(Continued)

(52) U.S. Cl.
CPC ......... *G02B 21/245* (2013.01); *F16M 11/046* (2013.01); *F16M 11/18* (2013.01);
(Continued)

(58) Field of Classification Search
CPC .......... G02B 7/00; G02B 7/003; G02B 7/004; G02B 7/005; G02B 7/36; G02B 21/00;
(Continued)

(56) References Cited

U.S. PATENT DOCUMENTS 5,825,536 A 10/1998 Yasunaga et al.
6,677,565 B1 1/2004 Wahl et al.
(Continued)

FOREIGN PATENT DOCUMENTS

DE 42 13 312 10/1993
DE 697 16 018 9/2002
(Continued)

OTHER PUBLICATIONS

Notification of Transmittal of Translation of the International Preliminary Report on Patentability (International Application No. PCT/EP2014/073039) dated May 19, 2016.
(Continued)

*Primary Examiner* — Arnel C Lavarias
(74) *Attorney, Agent, or Firm* — Nixon Peabody LLP; Jeffrey L. Costellia

(57) ABSTRACT

A digital microscope having a pivoting stand, a method for calibrating said stand and a method for automatic focus tracking and image center tracking upon actuation of the pivoting stand. The pivoting stand includes an angle sensor for determining a current pivot angle of the pivot arm (07). The current pivot angle is processed in the control unit to execute automatic focus tracking and/or center tracking upon actuation of the pivot arm (07). Calibration is performed using two pivot angles, wherein deviating focus and image center positions are ascertained, and a pivot-angle-dependent function for focus and the image center position is ascertained therefrom.

9 Claims, 7 Drawing Sheets

(51) Int. Cl.
  *G02B 21/26* (2006.01)
  *F16M 11/04* (2006.01)
  *F16M 11/18* (2006.01)
  *F16M 11/20* (2006.01)
  *G02B 21/36* (2006.01)

(52) U.S. Cl.
  CPC ..... *F16M 11/2021* (2013.01); *G02B 21/0012* (2013.01); *G02B 21/241* (2013.01); *G02B 21/26* (2013.01); *G02B 21/365* (2013.01); *F16M 2200/021* (2013.01)

(58) Field of Classification Search
  CPC .............. G02B 21/0004; G02B 21/0012; G02B 21/24; G02B 21/241; G02B 21/242; G02B 21/244; G02B 21/26; G02B 21/32; G02B 21/36; G02B 21/361; G02B 21/362; G02B 21/364; G02B 21/365
  USPC ....... 359/362, 363, 368, 369, 379, 380, 382, 359/383, 384, 391, 392, 393
  See application file for complete search history.

(56) References Cited

U.S. PATENT DOCUMENTS

| 9,007,452 | B2 | 4/2015 | Kang |
| 2005/0036674 | A1 | 2/2005 | Beer et al. |
| 2005/0117207 | A1 | 6/2005 | Haisch |
| 2005/0237604 | A1 | 10/2005 | Kawano et al. |
| 2013/0050464 | A1* | 2/2013 | Kang .................. G02B 21/367 348/79 |
| 2013/0104651 | A1 | 5/2013 | Li et al. |

FOREIGN PATENT DOCUMENTS

| DE | 102 24 211 | 12/2003 |
| DE | 102 32 242 | 2/2004 |
| DE | 102 32 688 | 2/2004 |
| DE | 10 2008 012 301 | 9/2009 |
| DE | 102012215307 | 2/2013 |
| JP | 2001-059599 | 3/2001 |
| JP | 2006-300553 | 11/2006 |
| JP | 2010-102344 | 5/2010 |
| JP | 2013-072996 | 4/2013 |
| WO | WO 02/095476 | 11/2002 |

OTHER PUBLICATIONS

International Search Report (Application No. PCT/EP2014/073039) dated Jan. 20, 2015.

German Office Action (Application No. 10 2013 222 295.5) dated Apr. 11, 2013.

Erläuterungen zu Abschnitt C. Ergebnis der Druckschriftenermittlung, Apr. 1, 2013.

* cited by examiner

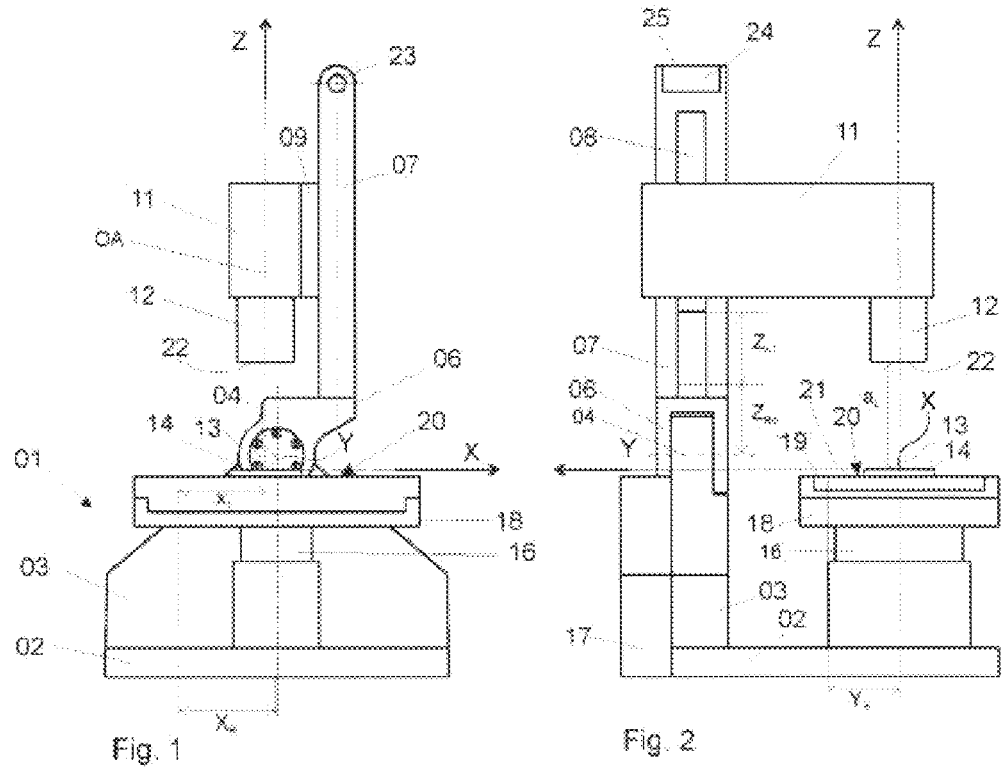
Fig. 1
Fig. 2
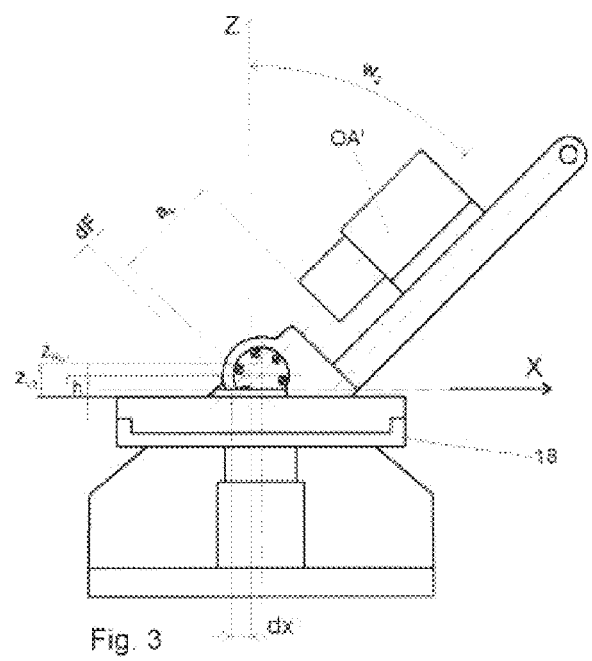
Fig. 3

DIGITAL MICROSCOPE COMPRISING PIVOTING STAND, METHOD FOR CALIBRATION AND METHOD FOR AUTOMATIC FOCUS AND IMAGE CENTER TRACKING FOR SUCH A DIGITAL MICROSCOPE

TECHNICAL FIELD

The present disclosure relates generally to a digital microscope, a method for calibrating a digital microscope, and a method for automatic focus and image center tracking during operation of such a digital microscope, as described herein.

BACKGROUND

Ideally, in a microscope having a pivoting stand, the optical axis of the imaging system and the pivoting axis of the stand should be arranged perpendicular to one another. However, during the pivoting process, image and focus shifts occur when the surface of the object being viewed is not located in the plane of the pivoting axis, or when the detail being viewed is not located at the point of intersection of the axes.

The prior art contains a plurality of operating microscopes which can be freely positioned by means of a special suspension mechanism above the object being microscoped. For example, DE 42 13 312 A1 discloses an operating microscope in which, based on the magnification adjustment, the focusing speed is adjusted to enable a focus adjustment, tilt adjustment or canting adjustment. In this case, the zoom motor adjustment serves as a setting signal for the focus and for the X- or Y-adjustment. From DE 697 16 018 T2 and U.S. Pat. No. 5,825,536, control mechanisms for operating microscopes having multipart articulated arms are known. Motors are activated to cause the multiple arm sections to execute predefined movements. A force/torque sensor is used to determine an operating force in the direction of multiple axes, to enable arm sections and joints to be actuated in support of operation. An angle sensor is used to detect the current angle of each joint, enabling the position and the movement profile of the microscope to be calculated therefrom.

US Patent Publication 2005/0117207 A1 discloses an operating microscope having a multipart articulated arm and a controlling mechanism which holds the focus region largely constant independent of arm movement. In this case as well, angle sensors are used to detect the positions of the joints in order to determine the position of the microscope.

JP-2001059599-A2 and JP-2010102344-A2 describe a pivot arm stand for digital microscopes, which comprises a pivot arm which is pivotable about a horizontal rotational axis. The pivot arm comprises an upper focusing unit, which can be moved vertically along a column for preliminary coarse adjustment and clamped in place by means of a hand wheel. Parallel with the aforementioned simple column guide, a support for a zoom element/objective combination can be more finely positioned for focusing. The aforementioned specifications relate to the vertical adjustment of the pivot arm, i.e. when the pivot arm is pivoted about the rotational axis, the focusing movements take place under the corresponding pivot angle. To avoid disruptive misalignment, the user must adjust three knobs until the optical axis intersects with the actual rotational axis in question. For users who are inexperienced with such adjustment processes, it is extremely difficult to perform this adjustment rapidly and with adequate precision. To loosen one knob, at least one of the other two knobs must be tightened, and in most cases the actual adjustment direction that results from the tightening process is not the same as the desired adjustment direction. Furthermore, the assembly is relatively costly and decreases the stability of the system as a whole substantially; as a result, the camera images tend to oscillate particularly during and immediately following manipulation of the knobs, further hampering the adjustment process. The adjustments can also be easily lost if the knobs are inadvertently touched or are mistaken for the setting screw.

JP 2013-072996 describes a microscope system where a displacement and defocusing of an observation point can be corrected. To accomplish this, status information about states in which the focus adjustment and the rotational axis of the pivoting stand coincide is stored in a storage unit. These states can be specifically called up later. What is problematic in this case is that for every state that is not stored, costly calibration processes are necessary, and therefore deviations caused by a change in the pivot angle cannot be compensated for over the entire pivot angle range.

In general, calibration is costly because axial positions and axial alignments can vary between instruments due to manufacturing tolerances.

It is the object of the present disclosure to provide a digital microscope having a pivoting stand, and a method for calibrating the same. The digital microscope should be calibrated such that the system can be readily understood and easily handled even by inexperienced users, and such that a rapid generation of a focused image of a specimen detail, which is not displaced laterally in the image in relation to the vertical adjustment, is ensured for any pivot angle. This should be enabled even during automatic operation.

The digital microscope comprises, in a known manner, an optical unit, which comprises at least one objective and an image processing unit. A longitudinal axis of the objective forms an optical axis (Z-axis).

A pivoting stand has a pivot arm which is pivotable about a pivoting axis (Y-axis), and on which a support for holding the optical unit is arranged, preferably so as to be movable longitudinally by a motorized mechanism.

A specimen stage can preferably be adjusted by a motorized mechanism in at least two axes, which are ideally perpendicular to one another, with a specimen stage plane spanned by these axes being oriented parallel or nearly parallel to the pivoting axis (Y-axis).

The specimen stage and pivoting stand are preferably arranged on a base.

The digital microscope further has a control unit for controlling the optical unit, the pivoting stand and the specimen stage.

According to the present disclosure, the pivoting stand comprises an angle sensor for determining a current pivot angle of the pivot arm. The determined pivot angle is optionally used by the control unit to determine focus tracking and specimen stage tracking, enabling the focus and the specimen stage position to be corrected upon actuation of the pivot angle.

A method according to the present disclosure for calibrating a digital microscope having a pivoting stand comprises the following steps: adjusting a first pivot angle of the pivot arm; bringing a calibration marking located on the specimen stage into focus by moving the support along the optical axis (OA) or by moving the specimen stage in a vertical direction; centering the calibration marking with the optical axis by moving the specimen stage along two axes (X, Y) that are perpendicular to the optical axis (OA) when the pivot arm (07) is in the upright position; detecting and storing all first axial positions of the specimen stage and the support and of the first pivot angle; pivoting the pivot arm to a second pivot angle; bringing the calibration marking into focus for a second time; centering the calibration marking for a second time; detecting and storing all second axial positions of the specimen stage and the support and of the second pivot angle, determining a relative focus difference dF and a relative pivoting axis difference dx from the first and second axial positions; ascertaining a pivot-angle-dependent function for actuating a control unit of the digital microscope for the purpose of correcting the relative focus difference and the relative pivoting axis difference.

The differences determined during the calibration process are stored and are used for ascertaining an angle-dependent deviation of focus and centering position, which is then used during microscope operation for automatic focus tracking and image center tracking upon actuation of the pivot arm.

This calibration process is preferably performed in the factory, so that consumers receive a pre-calibrated instrument.

Additional calibration processes may optionally be performed by the consumer.

Some advantages of the present disclosure include particularly the fact that part of the cost-efficient calibration method can be performed at the factory, resulting in a substantial decrease over the prior art in the amount of adjustment and alignment that must be performed by the user. More particularly, the pivot angle of the pivot arm of a pivoting stand for digital microscopes can be infinitely varied without the viewed specimen detail changing in terms of image sharpness or its position displayed in the image. Object coordinates are advantageously indicated as relative coordinates which do not change with automatic focus tracking and image center tracking.

In this process, the position of the pivoting axis relative to the viewed specimen detail is assumed to be unknown. The specimen height that can be used for pivoting can be increased over the prior art.

The pivoting stand is also more stable and can be produced more cost-efficiently, since additional alignment points and/or a narrower tolerance range for all components that are relevant to the pivoting function can be dispensed with.

When the calibration method according to one embodiment of the present disclosure is used, users are required only to perform a set process, which is likewise simplified. This enables even users who are inexperienced with adjustment processes to operate the microscope, and dramatically reduces the amount of time required to achieve a deviation-minimized pivot function.

By additionally factoring in operating steps that must be performed in any case during the routine use of digital microscopes, the amount of time required from switching on the system to using a deviation-minimized pivot function can be decreased substantially over the prior art.

In principle, the specimen plane or the specimen detail being brought into focus does not have to lie at the height of the rotational axis actually in use. Therefore, in contrast to the prior art, the method is not limited to specimen heights which cannot be greater than the usable guide path of the lower Z-guide below the rotational axis actually in use. This even enables one of the two Z-guides, along with its control, to be optionally dispensed with as long as the movement ranges of the X-axis and the remaining Z-axis are large enough.

The cost savings that can be achieved over the prior art with the method according to one embodiment of the present disclosure and the simplifications of operation which produce faster results mean a significant optimization of the orientation of the product toward the targeted group.

In a preferred embodiment of the digital microscope, the angle sensor is implemented by means of two inertial sensors (acceleration or position sensors), one of which is arranged (with respect to the pivoting function) on a mounting plate in the stationary stand, and the other in the moved part (in the optical engine or in the zoom element). A vertical positioning of the pivot arm is characterized by a perceptible locking. In this locked position, the angle value of the inertial sensor of the moved part should be set, within the framework of a one-time calibration, to the angle value of the inertial sensor of the stand, so that for the locked position, a differential angle of 0° (ZERO) results. The pivot angle is thus determined from this differential angle. The advantage here is that these cost-efficient sensors can also be used with an inclined stand, with acceptable residual error.

Of course other types of angle sensors are also possible, with optoelectronic, magnetic and electrically operating angle sensors being suitable, for example.

The support and the specimen stage can preferably be moved by a motorized mechanism. Alternatively, the electric drive may also be dispensed with as long as a coding of the axial drives is provided. And this coding is necessary only in at least one axis provided for focusing and in the X-axis of the specimen stage, each of which is provided for the correction process (upper, lower or both Z-axes), in which case the adjustment to compensate for deviations can no longer be carried out automatically due to the lack of a motorized mechanism, and must instead be performed by the user based on the X- and Z-coordinates, which are then indicated as the target setpoints.

Transitioning to an indication of specimen coordinates is advantageous because deviations that result solely from the current environment of the system are not relevant to the user if they are automatically corrected by the system. Thus following a change in the pivot angle, not only are the position and sharpness of the specimen detail being focused on and visible in the image maintained, so are all indicated XYZ-coordinates.

If an upper and a lower coded or motorized Z-axis is present, a specimen height can also be read directly from this. For this purpose, the specimen plane is preferably positioned over the upper Z-guide at the height or Z-position of the rotational axis actually in use, with the coordinate display for the upper Z-guide showing a value of ZERO. The specimen height can then be read directly via the coordinate display for the lower Z-guide, and the user can be informed of this by a notation displayed accordingly with the coordinates.

The acquisition of data for focus tracking in the automatic correction process should preferably be carried out in a state in which the specimen plane is located near the pivoting axis, as in that case the deviations will be smaller, and correspondingly shorter movement distances will be required to compensate for the deviations, making this faster. Nevertheless, it is highly advantageous that the usable specimen height, which has heretofore been limited by the guide path of the lower Z-guide, can be increased for the pivoting movement according to one embodiment of the present disclosure, so that a pivoting movement is also supported for specimen heights that are greater than the guide path of the lower Z-guide.

In terms of a desired reduction in costs, due to the efficiency of the method according to one embodiment of the present disclosure, which can be realized even with greater deviations between the ideal pivoting axis and the pivoting axis, the pivoting stand can be equipped with only a single Z-guide, or the second Z-guide can be dispensed with.

In this case, the motorized X-axis of the motorized XY-stage and the remaining Z-guide would have to move greater distances for correction, however a significant reduction in overall costs would result, especially since the costs of electronics and of actuating the corresponding Z-axis can also be reduced as a result. In principle, it is also possible to eliminate the upper or the lower Z-guide. Using an upper Z-guide without a lower Z-guide results in a more stable assembly overall, and the specimen does not need to be moved vertically.

The specimen detail is preferably embodied as a cross. The arms of the cross in the X-direction are preferably long enough for any deviations that may occur in practical use.

BRIEF DESCRIPTION OF THE DRAWINGS

FIG. 1 is an exemplary front elevation of a digital microscope according to the invention having a pivoting stand, with a pivot arm in the upright position;

FIG. 2 is an exemplary side elevation of the digital microscope shown in FIG. 1;

FIG. 3 is an exemplary front elevation of the digital microscope shown in FIG. 1 having a tilted pivot arm without calibration;

Figure 4:
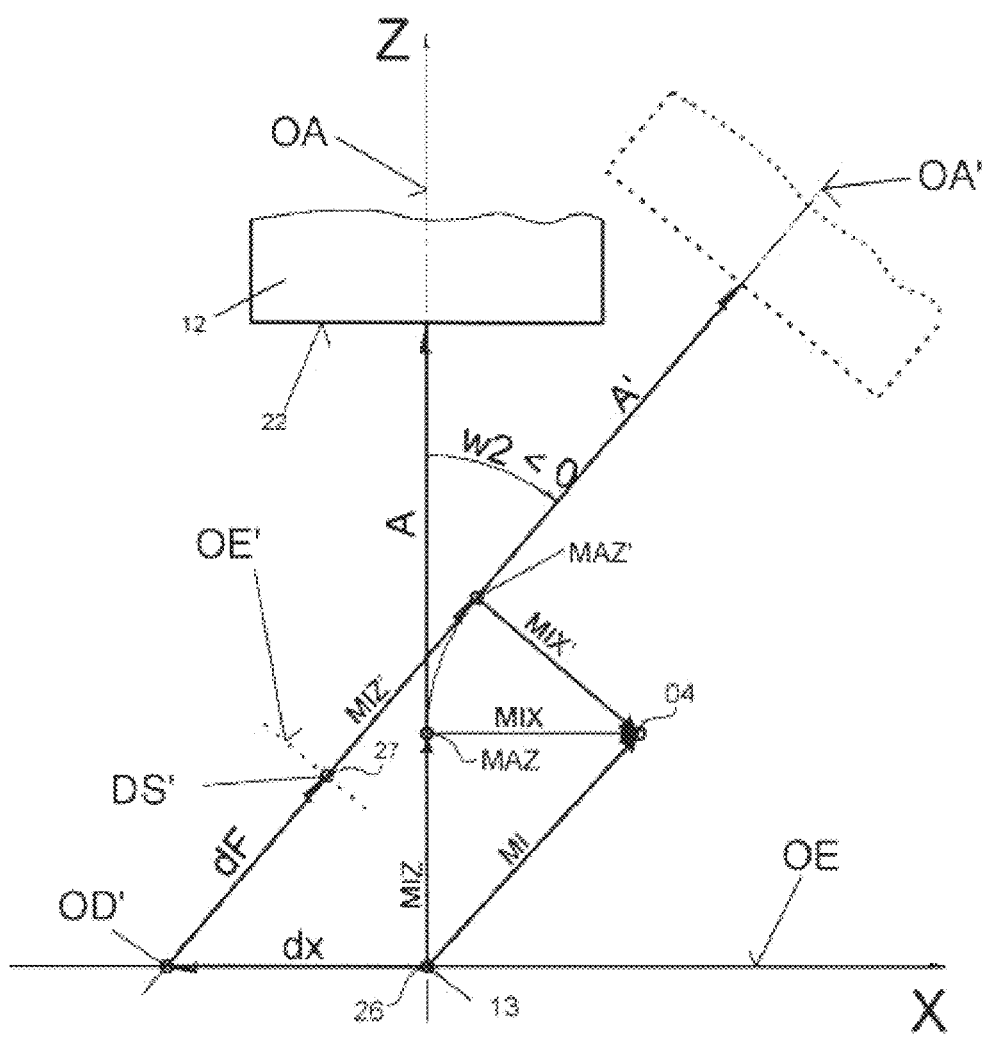
FIG. 4 is an exemplary vectorial representation of the geometric relationships in a digital microscope according to one embodiment of the present disclosure, after a pivoting process.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

FIGS. 1 to 3 show a digital microscope having a pivoting stand in various elevations and with adjustments of a pivoting stand at various tilts.

FIG. 1 is a representation of the front elevation of the digital microscope having a pivoting stand 01, from the point of view of the user. FIG. 2 shows a side elevation of pivoting stand 01 from the left.

For purposes of orientation, a spatial system of coordinates is established, which comprises, as viewed from the illustration plane of FIG. 1, an X-axis pointing positively toward the right, a Y-axis pointing positively into the image plane and a Z-axis pointing positively upward.

Pivoting stand 01 comprises a stand base 02, on which a pedestal 03 is mounted, in which a bearing is integrated for an articulated part 06, which is capable of pivoting about a pivoting axis 04 and on which a pivot arm 07 is fixedly arranged. On pivot arm 07, a preferably motorized upper Z-guide 08 is arranged, via which a support 09, which holds an optical unit 11, can be moved in the Z-position relative to a reference position $Z_{Ro}$. Reference position $Z_{Ro}$ of (motorized) upper Z-guide 08 is indicated relative to pivoting axis 04 and results from a defined movement into position via a suitable sensor device during the initialization process of (motorized) upper Z-guide 08. This sensor device is formed, for example, by a target which is moved along during Z-movement, and a hybrid coupler (a photoelectric barrier) mounted so as to remain stationary, which halts Z-movement during the initialization process as soon as the movement of the target into the hybrid coupler alters the switching state of the hybrid coupler. Alternatively, other technical solutions that are known to a person skilled in the art and are sufficiently reproducible may also be used as the sensor device. For example, a Hall sensor and a magnet may also be used, in which case the Hall sensor replaces the hybrid coupler and the magnet replaces the target. The reproducibility that can be achieved with the sensor device as the maximum deviation from the actual reference position is several orders of magnitude smaller than could be ensured through calibration processes or with typical manufacturing inaccuracies and cost-optimized production.

With a sufficiently precise (motorized) upper Z-guide 08, as can be assumed in digital microscopes, the Z-positions therefore also have correspondingly small deviations relative to reference position $Z_{Ro}$.

In FIGS. 1 and 2, a first Z-position $Z_{o1}$ of support 09 relative to reference position $Z_{Ro}$ is shown for the parts that are movable via the (motorized) upper Z-guide 08, wherein support 09 holds optical unit 11, which comprises a zoom system, an integrated light source and camera (not shown) and an objective 12.

The first Z-position $Z_{o1}$ is characterized in that a specimen detail 13, located on the upper side of a specimen 14, is imaged in sharp focus on an image sensor, not shown, with pivot arm 07 in the vertical position, wherein the Z-coordinates of specimen detail 13 and of pivoting axis 04 are not identical.

A preferably motorized lower Z-guide 16 is mounted on stand base 02, although motorized lower Z-guide 16 could also alternatively be mounted on pedestal 03. The back side of pivoting stand 01 is preferably covered by a dust cover 17.

On (motorized) lower guide 16, which is variable relative to a reference position $Z_{Ru}$ in terms of the Z-position (see FIG. 3), a preferably motorized specimen stage 18 is arranged, which contains a stage plate 19, in which a reflected light insert plate 20, the upper surface 21 of which serves as a specimen surface, is integrated. The (motorized) specimen stage 18 allows an X-position of the specimen detail 13 to be varied relative to a reference position $X_R$ and the Y-position of specimen detail 13 to be varied relative to a reference position $Y_R$. The above specifications relating to reference position $Z_{Ro}$ apply similarly to reference positions $Z_{Ru}$, $X_R$ and $Y_R$, i.e. in this case as well, the maximum deviations in reproducibility are sufficiently small.

According to FIGS. 1 and 2, a third Z-position $Z_{u3}$<0 is set relative to reference position $Z_{Ru}$ by means of (motorized) lower Z-guide 16, in which the Z-position of specimen detail 13 is not identical to the Z-position of pivoting axis 04 ($Z_{Ru}$ and $Z_{u3}$ are shown in FIG. 3).

According to FIGS. 1 and 2, a first X-position $X_1$>0 is set relative to reference position $X_R$ on the X-axis of (motorized) specimen stage 18, in which, when pivot arm 07 is oriented vertically, specimen detail 13, which is positioned centered in the X-direction relative to the entire area of movement of specimen stage 18, of specimen 14, which is placed on upper surface 21 of reflected light insert plate 20, should be located at the center of the image.

In practical terms, according to FIG. 1, different X-coordinates between specimen detail 13, which should be at the center of the image, and pivoting axis 04 result in deviations.

On the Y-axis of (motorized) specimen stage 18, a first Y-position $Y_1$>0 is set relative to reference position $Y_R$, in which, when pivot arm 07 is aligned vertically, specimen detail 13, which is positioned centered in relation to the entire area of movement of specimen stage 18 in the Y-direction, of specimen 14, which is placed on upper surface 21 of reflected light insert plate 20, should be located at the center of the image. Since the deviations which also occur here in practical terms are not relevant for the view according to the invention, the deviations have not been shown in FIG. 2, and for in FIG. 2, the following applies: $Y_1=-Y_R$.

FIGS. 1 and 2 show pivoting stand 01 in the focused state, i.e. the upper side of specimen 14, which is placed on upper surface 21 of reflected light insert plate 20, is located in a specimen plane of the imaging system, wherein the upper side also contains specimen detail 13, and a working distance $a_L$ describes the distance of an end face 22 of objective 12 from the specimen plane in the focused state. Specimen 14 has a height h up to the upper side to be brought into focus, or specimen detail 13.

Pivot arm movement is blocked by a high torque magnetic brake disposed around pivoting axis 04 and not described in greater detail here. The blocking can be removed for as long as pressure is applied to a button 23 according to FIG. 1 by releasing the high torque magnetic brake. Using an ergonomically formed area 24 with a handle surface 25 at the upper end of pivot arm 07, a pivot angle can thus be adjusted rapidly and infinitely, with the vertical alignment of pivot arm 07, which is used most frequently, being easily ensured or reproduced with sufficient precision by means of a locking assembly which is clearly perceptible during the pivoting movement. In FIGS. 1 and 2, the currently active pivot angle measures 0°.

Because, in principle, the focusing process can be implemented via both (motorized) upper Z-guide 08 and (motorized) lower Z-guide 16, the Z-coordinates of pivoting axis 04 can deviate relative to the Z-coordinates of specimen detail 13, even when specimen detail 13 is located in the specimen plane.

FIG. 3 shows the digital microscope according to FIG. 1 with pivot arm 07 pivoted around an angle w2. FIG. 4 shows a vectorial representation of the geometric relationships between an ideal pivoting axis 26 and pivoting axis 04 in the calibration operation according to the invention. In the following, vectors are denoted by an overline, and the amounts of the vectors have the same designators as the vectors but without an overline.

In contrast to the usual mathematical approach, however, the amounts here contain a sign that contains the directional information relative to the drawing. A negative sign for such a unidimensional variable in the calculation indicates in FIG. 4 a transposition of the starting point and ending point of the corresponding vector. In FIG. 4, vectors are symbolized only by arrows. The designations correspond to the designations from FIGS. 1 and 3. The newly added reference signs will be described in the following.

The position of pivoting axis 04 relative to ideal pivoting axis 26 or specimen detail 13 is described by the vector MI. This vector can also be broken down into vectors MIX and MIZ, arranged parallel to the coordinate axes, with vector MIZ ending at point MAZ and vector MIX beginning at point MAZ. Working distance $a_L$ between the specimen plane and end face 22 of objective 12 when pivot arm 07 is in the vertical alignment, not shown in FIG. 4, can be described by a corresponding vector AL, which is likewise not shown in FIG. 4 for reasons of clarity. Vector AL can be broken down into vector MIZ and vector A.

Pivoting pivot arm 07 around angle w2 causes the vectors to rotate accordingly about pivoting axis 04. In so doing, vector MIX becomes vector MIX', vector MIZ becomes vector MIZ', vector A becomes vector A', vector AL becomes vector AL' and point MAZ becomes point MAZ'. In addition, specimen plane OE is pivoted about pivoting axis 04, resulting in a pivoted specimen plane OE'. Vectors MIZ' and A' lie on pivoted optical axis OA'. At penetration point 27 where pivoted optical axis OA' passes through pivoted specimen plane OE', vector dF ends, which is a measurement of defocusing and which begins with laterally offset specimen detail OD'.

According to FIG. 4 and the above description relating to FIG. 4, the following is therefore true:

A=A'

AL=AL'

MIX=MIX'

MIZ=MIZ'

$\overline{A}=\overline{AL}-\overline{MIZ}$ $\overline{A'}=\overline{AL'}-\overline{MIZ'}$ $\overline{MIX}+\overline{MIZ}=\overline{dx}+\overline{dF}+\overline{MIZ'}+\overline{MIX'}$ or $$\begin{pmatrix} MIX \\ MIZ \end{pmatrix} = \begin{pmatrix} dx \\ 0 \end{pmatrix} + \begin{pmatrix} -dF*\sin(w2) \\ dF*\cos(w2) \end{pmatrix} + \begin{pmatrix} MIX*\cos(w2) \\ MIX*\sin(w2) \end{pmatrix} + \begin{pmatrix} -MIZ*\sin(w2) \\ MIZ*\cos(w2) \end{pmatrix}$$

After conversion, the following results:

$$MIX = 0.5*dx - 0.5*dF * \frac{\sin(w2)}{1-\cos(w2)}$$

$$MIZ = -0.5*dF + 0.5*dx * \frac{\sin(w2)}{1-\cos(w2)}$$

With these signed unidimensional variables MIX and MIZ, the position of pivoting axis 04 relative to ideal pivoting axis 26 is clearly described as a function of pivot angle w2 and can therefore be presumed to be known once these variables MIX and MIZ have been calculated and stored in the control unit, which can be integrated, for example, in the operating and display unit. All calculated data can be stored in the control unit and further used as needed.

Figure 5:
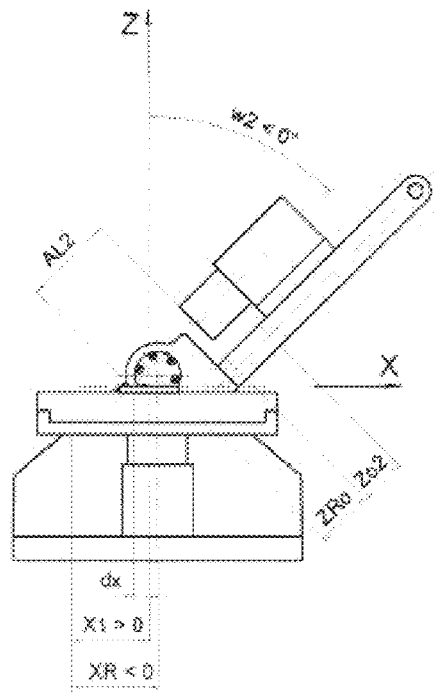
FIG. 5 is an exemplary front elevation of the digital microscope shown in FIG. 1 with a tilted pivot arm and corrected focus.
Figure 6:
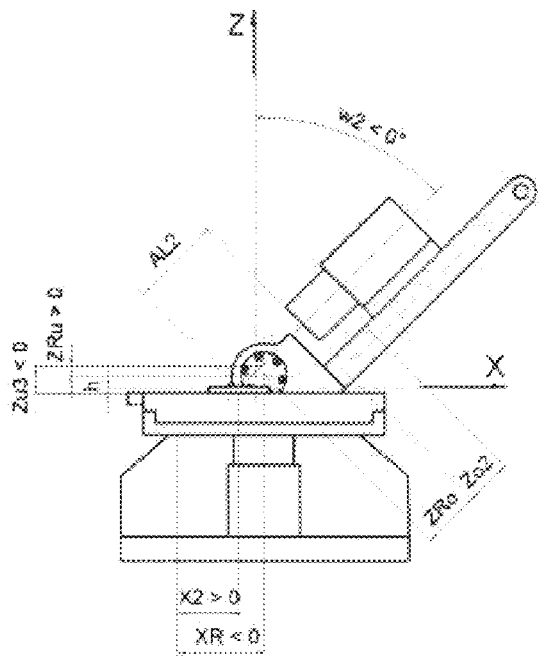
FIG. 6 is an exemplary front elevation of the digital microscope shown in FIG. 1 with a tilted pivot arm, corrected focus and corrected image center.

FIGS. 5 and 6 show representations of the front elevation of pivot arm 07 pivoted around pivot angle w2, using the calibration method according to the invention. The designations correspond to the designations from FIG. 1.

In contrast to the representation of FIG. 3, the defocusing distance dF has been adjusted by the method of the motorized upper Z-guide 08 to the Z-position Zo2 relative to reference position ZRo. From the difference between Z-position Zo1, which has not yet been refocused after pivoting, and the refocused position Zo2, defocusing distance dF can be easily determined as a signed unidimensional variable, in which dF=Zo1−Zo2.

FIG. 6 shows how the lateral specimen offset dx has been corrected by the method of the motorized specimen stage 18 in the X-direction to the X-position X2 relative to reference position XR. From the difference between the X-position X1, which has not yet been corrected, and the corrected position X2, the image center distance dx can be easily determined as a signed unidimensional variable, in which dx=x1−x2.

From signed unidimensional variables dF and dx, factoring in pivot angle w2, the likewise signed unidimensional variables MIX and MIZ can be determined according to the above calculation procedure. The present signed unidimensional variables MIX and MIZ fully describe the position of pivoting axis 04 relative to the ideal pivoting axis 26.

Using the correction operation according to the invention, it is possible to compensate for any pivot angle by further converting the previously calculated variables for lateral specimen offset dx and defocusing distance dF. To accomplish this, based on the current pivot angle $w_K$, in the correction operation the variables $dx_K$ and $dF_K$, which counteract the specimen offset and the defocusing distance, are calculated in the control device. The correction variables $w_K$, $dx_K$ and $dF_K$ which are each valid for any pivot angle are not shown in the figures.

From the relationships for determining signed variables MIX and MIZ according to FIG. 4, the likewise signed variables $dx_K$ and $dF_K$ for the correction operation according to the invention can be determined similarly following conversion, in which the following relationships apply:

$$dx_K = MIX * \frac{\cos(wK)-1}{\cos(wK)} + MIZ*\tan(wK)$$

$$dF_K = MIZ * \frac{1-\cos(wK)}{\cos(wK)} - MIX*\tan(wK)$$

The relationship $X_K$=X1−$dx_K$ results in an X-position $X_K$ of the X-axis of the (motorized) specimen stage 18 relative to reference position $X_R$, in which a specimen 14 placed on upper surface 21 of reflected light insert plate 20, centered relative to the entire movement range of specimen stage 18 in the X-direction, with pivot arm 07 aligned vertically, is located with a specimen detail 13 again at the image center after the pivoting of pivot arm 07 about pivot angle $w_K$ in the correction operation according to the invention.

The relationship $Zo_K$=Zo1−$dF_K$ results in a Z-position $Zo_K$ of the (motorized) upper Z-guide 08 relative to reference position $Z_{Ro}$, in which specimen detail 13 is sharply imaged with pivot arm 07 pivoted about pivot angle $w_K$ in the correction operation according to the invention.

Depending on the current pivot angle $w_K$ in the correction operation according to the invention, (motorized) specimen stage 18 is automatically positioned in the corresponding X-position $X_K$ relative to reference position $X_R$ and (motorized) upper Z-guide 08 is automatically positioned in the corresponding Z-position $Zo_K$ relative to reference position $Z_{Ro}$ via the control device, so that specimen detail 13 is located at the image center and is imaged in focus with each current pivot angle $w_K$ following the correction according to the invention.

In a calibration process according to the invention, preferably no specimen is located on specimen stage 18. In this process, a reference mark is brought into focus, which is preferably a component of upper surface 21 of reflected light insert plate 20 or the upper side of upper stage plate 19. Alternatively, a special calibration object may be used for this purpose, which contains the reference mark and which can be reproducibly placed on upper surface 21 of reflected light insert plate 20.

Figure 7:
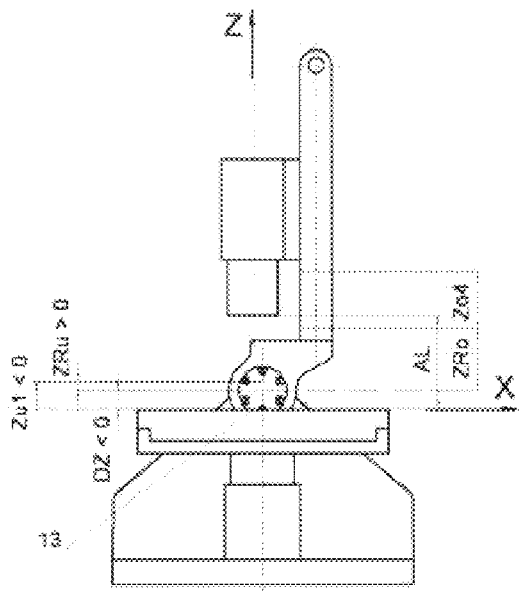
FIG. 7 is an exemplary front elevation of the digital microscope shown in FIG. 1 with an upright pivot arm, prior to acquisition of the necessary calibration data.

FIG. 7 shows the initial state prior to acquisition of the data required for calibration. Beginning from essentially any Z-position Zu1 of (motorized) lower Z-guide 16 relative to reference position $Z_{Ru}$, specimen detail 13 is preferably brought into focus by the user by means of motorized upper Z-guide 08, resulting in a fourth Z-position $Z_{o4}$ relative to reference position $Z_{Ro}$. Alternatively, focusing can be carried out automatically by means of an autofocusing system not specified in greater detail here.

The determination according to the invention of variable MIZ is then begun as shown in FIG. 4. For this purpose, the above-described calibration procedure is implemented and the variables MIZ and MIX are calculated using the relationships $$MIX = 0.5*dx - 0.5*dF * \frac{\sin(w2)}{1-\cos(w2)}$$

$$MIZ = -0.5*dF + 0.5*dx * \frac{\sin(w2)}{1-\cos(w2)}$$

The deviation DZ of specimen detail 13 relative to pivoting axis 04 in the Z-direction, which can be used for determining the data for an automatic focus tracking, then corresponds to the negative value for MIZ, i.e. the following are true:

$$DZ = -MIZ$$

$$Z_{u1} = DZ - Z_{Ru} < 0,$$

which results in $$Z_{Ru} = -MIZ - Z_{u1}$$

Since reference position $Z_{Ru}$ is given relative to pivoting axis 04, all other Z-positions of (motorized) lower Z-guide 16 that are indicated relative to this reference position $Z_{Ru}$ can be converted to Z-positions relative to pivoting axis 04. According to FIG. 7, specimen detail 13 is too low by the now known variable DZ<0, i.e. (motorized) specimen stage 18 must be moved upward by the amount of this variable via (motorized) lower Z-guide 16 in order for the specimen detail 13 being viewed to be located at the height of pivoting axis 04.

Figure 8:
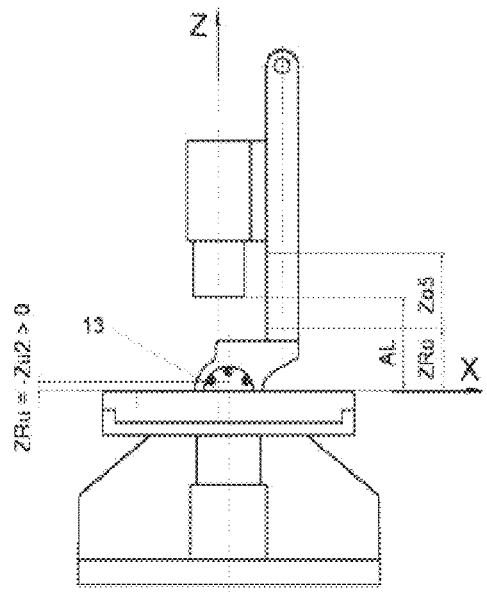
FIG. 8 is an exemplary state of the digital microscope in which the specimen stage is aligned at the height of the pivoting axis.

FIG. 8 shows the initial state following acquisition of the data required according to the description relating to FIG. 7, prior to automatic focus tracking and stage tracking. Specimen stage 18 has been moved upward via lower Z-guide 16 by the amount of variable DZ, so that specimen detail 13 being viewed is located at the height of pivoting axis 04. This results in a second Z-position $Z_{u2}$ relative to reference position $Z_{Ru}$ of lower Z-guide 16.

Since specimen detail 13 being viewed has been moved upward by the amount of variable DZ, the Z-position of (motorized) upper Z-guide 08 must also be moved upward accordingly, so that specimen detail 13 will continue to be located in the specimen plane. According to FIG. 8, this results in a fifth Z-position $Z_{o5}$ relative to reference position $Z_{Ro}$ of upper Z-guide 08. The focus position of objective 12 used in calibration for focusing on the specimen detail 13 positioned at the height of pivoting axis 04 is also clearly described thereby.

As long as the position of pivoting axis 04 relative to an ideal pivoting axis 26, the coordinates of which are fully known, has already been determined and stored once, the position of pivoting axis 04 can be reproduced with sufficient precision due to the provided sufficiently accurate absolute positioning precision, even after the system has been switched off and back on again. According to FIG. 8, the position of pivoting axis 04 is clearly described by Z-position $Z_{Ru}$, since this Z-reference position of the motorized lower guide 16 describes the position of upper surface 21 of reflected light insert plate 20, which serves as the specimen surface, relative to pivoting axis 04, and remains individually constant for each pivot stand 01. Moreover, the focus position of objective 12 used in calibration for focusing on specimen detail 13 which is positioned at the height of pivoting axis 04 is known.

If different objective variants are provided, these can be coded, so that the system recognizes which objective is currently being used when the system is switched on and each time the objective is changed, and is able to use this information for further actions. This also includes the automatic correction process according to the invention, which offers a substantial time advantage over the prior art. For this purpose, for each objective that will be supplied with a digital microscope, the focus position for focusing on specimen detail 13 positioned at the height of pivoting axis 04 is preferably set and stored already at the factory. Coding the objectives allows each of the stored values to be uniquely assigned to one objective.

Proceeding from the calibration process, which is preferably carried out at the factory, the data obtained during the calibration process can be used for the automatic correction process according to the invention, which completely takes over the corresponding necessary corrections from the now known position of pivoting axis 04 and the objective currently in use, to compensate for the deviations caused by the pivoting movement, thereby providing the user with a substantial time advantage. This time advantage can be increased even further according to the invention when specimen detail 13 to be viewed is already automatically located at the height of pivoting axis 04 when pivot arm 07 is in the vertical position.

Figure 9:
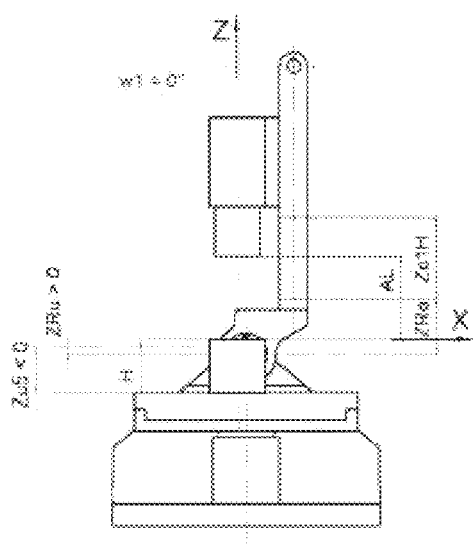
FIG. 9 is an exemplary digital microscope having an extended usable specimen height with the pivot arm upright.
Figure 10:
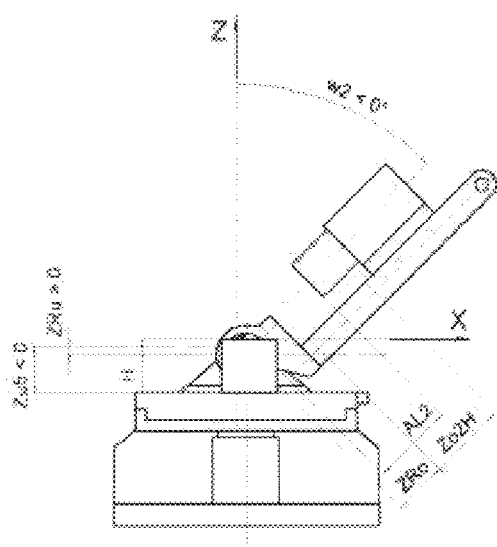
FIG. 10 is an exemplary digital microscope having an extended usable specimen height with the pivot arm tilted.

FIGS. 9 and 10 show representations for increasing the usable specimen height H according to the invention. It is highly advantageous if the usable specimen height for the pivoting movement, which has previously been restricted by the active guide path of lower Z-guide 16 below pivoting axis 04, can be increased such that a pivoting movement is also supported for specimen heights H that are greater than the guide path of lower Z-guide 16. In practical terms, specifically, ideal pivoting axis 26 may also lie above pivoting axis 04, and when lower (motorized) Z-guide 16 has been moved to its lowest point, correspondingly large specimen heights can be supported. When there is a risk of collision, a pivot angle restriction is possible.

Figure 11:
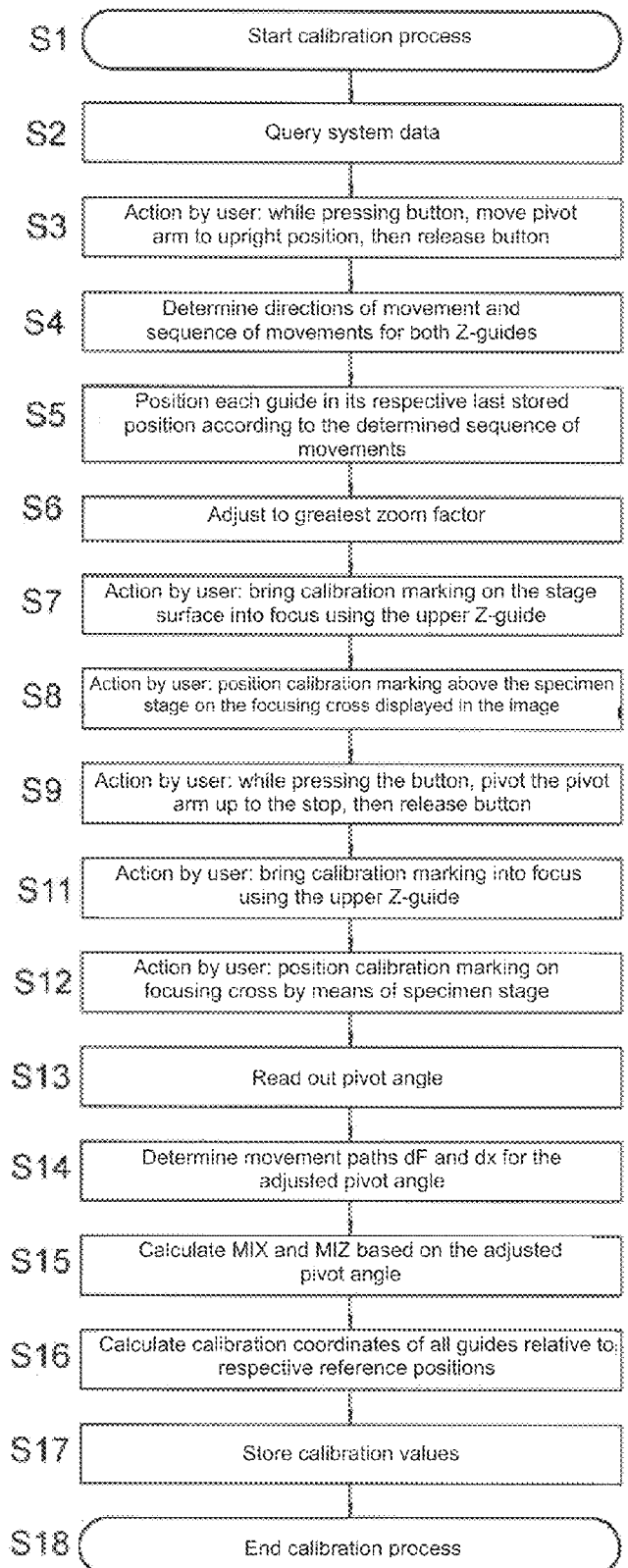
FIG. 11 is an exemplary method of an initial calibration process.

FIG. 11 shows a representation of calibration steps S1 to S18 according to the invention, which are preferably to be carried out in an initial calibration process at the factory, before the digital microscope system is delivered to the customer or user, in order to simplify operation for the customer and to unburden the user in terms of the amount of adjustment that is necessary before the pivoting function can be used. Of course, the calibration process can also be performed by the consumer, as long as the user interface is set up for this. In that case, operation should nevertheless be configured based on a factory calibration, such that a calibration to be performed by the consumer can be retrieved only indirectly, to minimize inadvertent retrievals of this functionality.

Figure 12:
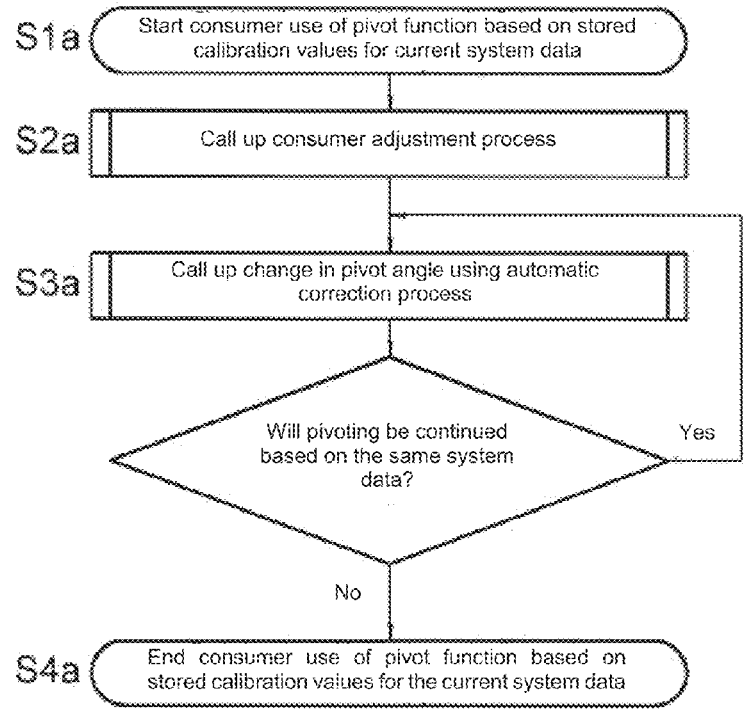
FIG. 12 is an exemplary method for using the pivot function, to be performed by a consumer.
Figure 14:
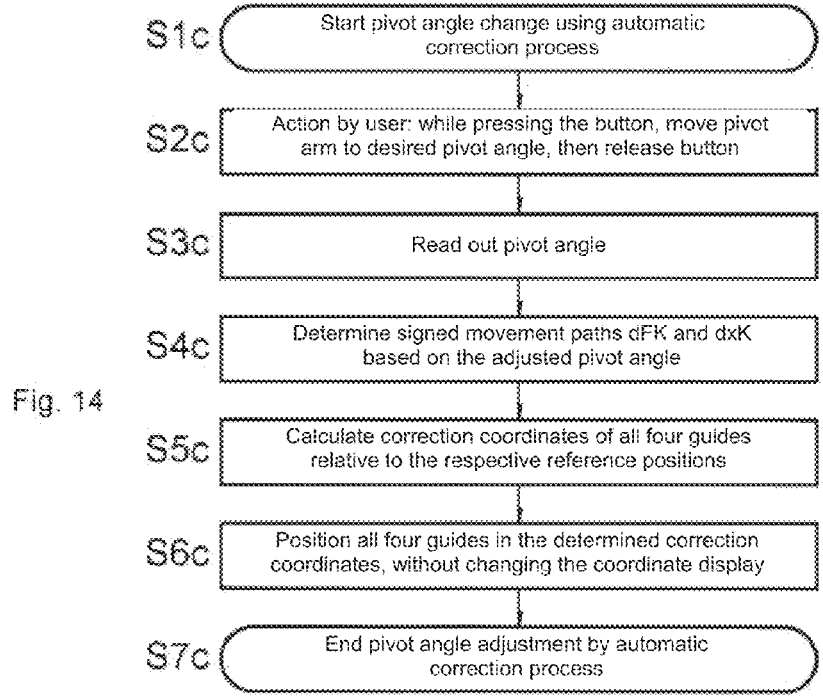
FIG. 14 is an exemplary method of an automatic correction process upon actuation of a pivot arm.
Figure 13:
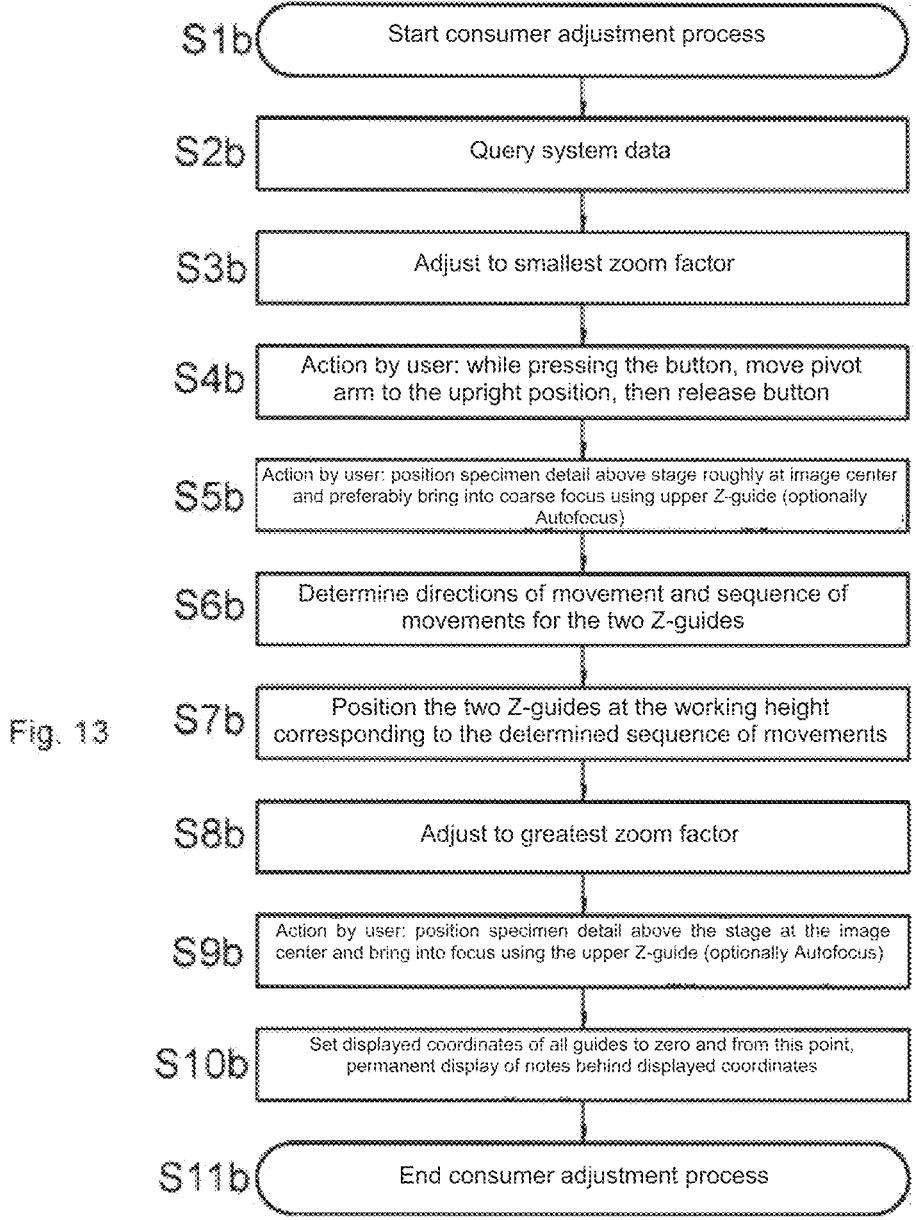
FIG. 13 is an exemplary method for setting up the digital microscope, to be performed by a consumer.

FIGS. 12 to 14 show representations of the steps according to the invention which are provided for when the consumer is using the pivot function and which are based on an initial calibration already carried out according to FIG. 11 and the above description.

Advantageously, the calibration processes are carried out via menu-controlled queries. An automatic correction can be provided by using the key signal or can be carried out only after confirmation by the user. Of course, the controller provides for a return to factory settings.

Furthermore, a one-time predetermination of the working distance of the objective in use (advantageous assignment by coding the objective) and the use of the stored, factory-set default Z-position of the motorized upper Z-axis for automatically moving to the specimen detail in the pivoting axis is possible. This can optionally be provided as a selection made via a selection button and/or by activating the key. Of course, autofocus functionalities of the digital microscope system may also be used for focusing.

All of the above statements relate to an optical axis (OA) of the imaging system, via which a specimen detail (13) arranged therein and in the specimen plane is always imaged at the image center, independently of other influences. However, the remaining imprecisions of the imaging system may lead, in practical terms, to a zoom center which deviates from the image center, and which is held stationary in the image when the zoom factor is changed. This then always corresponds to the position of the optical axis (OA), i.e. the calibration and correction processes according to the invention would then have to relate to this zoom center in the image and not to the image center. The specimen detail (13) would therefore have to be positioned on a target marking in the image in each case, which marking is arranged at the zoom center and not at the image center. The term "centering the calibration marking with the optical axis (OA)" also covers this case.

Of course, the scope of protection of this application also comprises the corresponding use of target marks in the image which deviate from the image center.

The invention claimed is:

1. A digital microscope comprising
an optical unit, which comprises at least one objective and an image processing unit, wherein a longitudinal axis of the objective defines an optical axis;
a pivoting stand having a pivot arm that is pivotable around a pivoting axis, and on which a support is arranged for holding the optical unit;
a specimen stage which is adjustable in at least two mutually perpendicular displacement axes, wherein one of the displacement axes is aligned parallel with the pivoting axis;
a control unit for controlling and positioning optical unit, pivot arm and specimen stage;
wherein the support and the specimen stage are displaceable; and
wherein the pivoting stand comprises an angle sensor for determining a current pivot angle of the pivot arm, wherein the angle sensor comprises two inertial sensors, each of which is disposed on a plate so as to be movable relative to each other, wherein the current pivot angle is processed in the control unit, in order to execute an automatic focus tracking and center tracking upon actuation of the pivot arm.

2. The digital microscope according to claim 1, wherein the support can be moved by a motorized mechanism in the direction of the optical axis.

3. The digital microscope according to claim 1, wherein the specimen stage can be moved by a motorized mechanism in a vertical direction.

4. The digital microscope according to claim 1, wherein the pivot arm is arranged locked in a first position having a pivot angle of ZERO.

5. The digital microscope according to claim 1, wherein the pivoting stand comprises a high torque magnet brake with which the pivot arm can be fixed in any pivot position.

6. A method for calibrating a pivoting axis and an image center in a digital microscope according to claim 1, comprising the following steps:

adjusting a first pivot angle of the pivot arm;
bringing a calibration marking located on the specimen stage into focus by moving the support along the optical axis or by moving the specimen stage in a vertical direction;
centering the calibration marking with the optical axis by moving the specimen stage along two axes that are perpendicular to the optical axis when the pivot arm is in an upright position;
detecting and storing all first axial positions of the specimen stage and the support and of the first pivot angle;
pivoting the pivot arm to a second pivot angle;
bringing the calibration marking into focus for a second time;
centering the calibration marking for a second time;
detecting and storing all second axial positions of the specimen stage and the support and of the second pivot angle,
determining a relative focus difference and a relative pivoting axis difference from the first and second axial positions;
ascertaining a pivot-angle-dependent function for actuating a control unit of the digital microscope for the purpose of correcting the relative focus difference and the relative pivoting axis difference.

7. The method according to claim 6, wherein the second pivot angle is determined relative to the first pivot angle, wherein the first pivot angle is defined as a reference position.

8. The method according to claim 6, wherein the control unit actuates the specimen stage and the support in order to shift a point of origin of a perpendicular system of coordinates formed by the optical axis when the pivot arm is in the upright position and the displacement axes in such a way that it coincides with the position of the calibration marking.

9. The method for automatic focus tracking and image center tracking in a digital microscope having the features of claim 1 upon actuation of the pivot arm, the method comprising:

detecting a pivot angle of the pivot arm; and
automatically adjusting a focus distance and an image center position based on the detected pivot angle.

* * * * *